June 12, 1923.
E. S. BRADFIELD
SHOCK ABSORBING DEVICE
Filed June 5, 1920
1,458,517
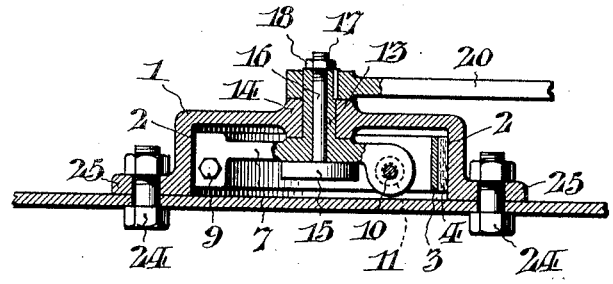
FIG. I.
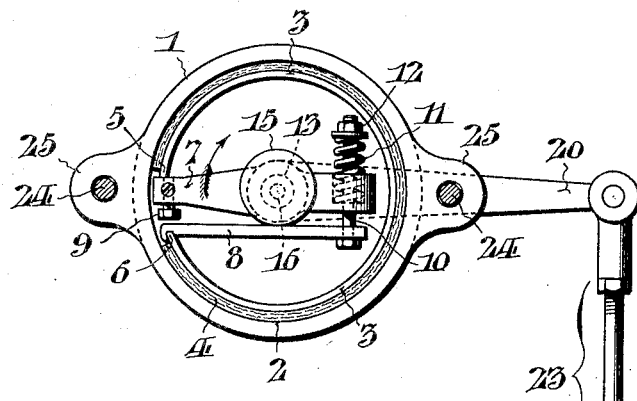
FIG. II.
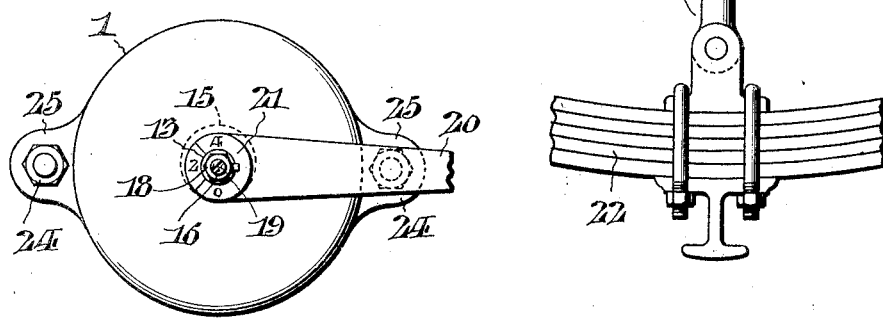
FIG. III.
WITNESSES:
John C. Berger
James H. Bell
INVENTOR:
Edmund S. Bradfield,
BY
Raleigh Paul
ATTORNEYS.

Patented June 12, 1923.

1,458,517

UNITED STATES PATENT OFFICE.

EDMUND S. BRADFIELD, OF MEDIA, PENNSYLVANIA.

SHOCK-ABSORBING DEVICE.

Application filed June 5, 1920. Serial No. 386,762.

*To all whom it may concern:*

Be it known that I, EDMUND S. BRADFIELD, a citizen of the United States, residing in Media, in the county of Delaware and State of Pennsylvania, have invented certain new and useful Improvements in Shock-Absorbing Devices, whereof the following is a specification, reference being had to the accompanying drawings.

The invention relates to shock absorbing devices which are useful in association with automobile springs, doors, box lids, or in other instances, where it is desired to retard the movement of two relatively movable elements.

The object of the invention is to provide a shock absorbing device which has capacity for resisting movement in one direction to a greater degree than in the opposite direction, and wherein the unequal resisting forces, and likewise the ratio between them are maintained practically constant throughout the range of movement in either direction, and which has the further advantage of being capable of adjustment so that the values of the resistances may be varied to meet the requirements of any particular application of the device in practice.

A typical embodiment of a shock absorbing device by which the advantages pointed out may be attained is represented in the drawings, in which Fig I, is a sectional view;

Fig. II, an elevation, showing the device in association with an automobile spring; and Fig. III, an external view of the device.

As herein represented, the structure comprises a casing 1, preferably of a circular contour, with the inner periphery 2, of which co-operates an expansible rotatable metallic band 3, faced with a replaceable friction facing 4, of any suitable material such, for example, as woven asbestos or the like. The band 3, is split and its adjacent ends 5, 6 are spaced apart by a considerable interval so that engagement may be had with the elements by which rotation is induced. These elements are in the form of a rotor finger 7, which is adapted to engage the end 5, of the band 3, and supplemental lever 8, which engages with the other end 6, of the band. The outer end of the finger 7, carries an adjustable stop screw 9, the purpose of which will be later set forth herein. The lever 8, is connected to the finger 7, by a screw bolt 10, having associated with it, a helical tension spring 11, which acts to maintain the active ends of the finger 7, and the lever 8, separated and in engagement with the respective ends 5 and 6, of the band 3. The tension of the spring is adjustable by means of an abutment nut 12 threaded on the bolt 10. The rotor finger 7, and the attached lever 8, are adapted to be bodily rotated within the casing. To this end, the finger is provided with an integral shaft extension 13, which is journaled in a central bearing 14, formed in the casing. Intermediate its ends, the lever 8, rests against an eccentric cam disc 15, secured to the inner end of a stem 16, extending co-axially through the shaft extension 13, of the finger 7. The outer end of the stem is threaded as shown at 17, to receive a jam nut 18. By this arrangement, it will be seen that the cam disc 15, may be rotatably shifted to vary the tension of the spring 11, and the pressure upon the lever 8. This may be accomplished from the exterior of the structure, a slot 19 for the engagement of a screw driver or other tool, having been provided in the outer end of the stem 16, for this purpose (Fig. III). To the top of the shaft extension 13, of the finger 7, is keyed an actuating lever 20, the upper face of the bearing hub 21, of which is graduated as a dial (Fig. III) so that the position of the cam disc 15, and the corresponding adjustment of the spring 11, may be coordinated with the screw driver slot in the upper end of the stem 16,—one extremity of said slot being appropriately indented to serve as an arrow head for this purpose as clearly shown in said figure.

When employed as a shock absorber for automobiles, the end of the actuating arm 20, may be connected to the vehicle spring 22, by an adjustable connecting link 23. The casing 1, can be secured, at any convenient point, to the body of the vehicle, attachment being effected by means of bolts 24, engaging with ears or lugs 25, formed as integral projections of the casing.

The action of the device may be best studied from Fig. II. Referring for a moment to this illustration, it will be seen that when the induced motion is in the direction of the arrow thereon shown, the rotor finger 7, becomes directly effective upon the end 5, of the band 3, to shift the latter within the casing. The force of the rotor finger 7 on end 5 of the band 3 may be resolved into two components, one acting parallel to the circumference of the band and one perpendicular thereto. The force acting perpendicular to the band 3 causes friction between the lining 4 and the interior of the casing 2, which absorbs part of the other component of the force of finger 7 on the band end 5. When motion of band 3 in casing 1 takes place, there must be exerted by finger 7 on end 5 of band 3 such force that there will be transmitted to end 6 of band 3 a force equal to the force exerted on end 6 of band 3 by the lever 8. When, therefore, motion in the direction of the arrow occurs, the force exerted by finger 7 on end 5 of band 3 must be several times that exerted on end 6 by lever 8. When the compression of spring 11 is varied by suitable means,—as, for instance, cam 15,—the force applied by lever 8 on end 6 of band 3 when movement occurs is correspondingly varied, and hence the force applied by finger 7 on end 5 of band 3 is also varied. On the other hand, if the induced rotation is in the opposite direction to that above considered, the lever 8 becomes directly active upon the end 6, of the band 3, to rotate the latter, but it will be seen that the spring 11 at this time, allows a certain amount of yielding so that the engagement between the end 5 of the band 3, and the finger is correspondingly eased or broken entirely. In the latter event, the adjustable stop screw 9, at the end of the finger engages directly with the lever 8 and assists in moving the same. As a consequence, the pressure upon the band 3, is relieved in direct proportion. It will thus be obvious that the effective force tending to resist rotation in one direction is greater than that tending to resist motion in the opposite direction, but that the resistance offered in each instance remains practically constant throughout the range of the induced movement. Such differential action is of great advantage in connection with vehicles where it is highly desirable to retard the rebound of the springs to a greater extent than the initial recoil so as to more effectively absorb or dampen the shocks incidental to travel.

In practice, I prefer to so proportion the various elements of the structure that resistance to movement in one direction may be made from two to ten times greater than that effective in the other. Adjustment of these resistances may be made by first, regulating the tension of the spring 11 to the desired degree by shifting the position of the abutment nut 12, on the bolt 10, and subsequently relying upon the shifting of the cam disc 15, as already explained.

Having thus described my invention, I claim:

1. A shock absorbing device comprising a casing, a split expansible friction band in said casing, and variably adjustable connections operating between the free ends of said band for moving the same around the casing, one of said connections including a resilient element and exerting pushing pressure on said band when moved in either direction, while the other exerts a pressure on said band when moving one way only.

2. A shock absorbing device comprising a circular casing, a relatively rotatable, split, friction band adapted for co-operation with the inner periphery of the casing, the ends of said band being separated by a considerable interval; a finger and a lever rotatable together within the casing but having capacity for a limited relative play between them, said finger and lever having their respective extremities engaging the adjacent ends of the friction band; a spring operative between the said finger and lever in such manner that the resistive friction of the band is rendered greater to rotation of the band in one direction than in the other; and means for adjusting the tension of the spring to vary the frictional resistances induced.

3. A shock absorbing device comprising a circular casing; a relatively rotatable, split, friction band adapted for co-operation with the inner periphery of the casing, the ends of said band being separated by a considerable interval; a finger and a lever rotatable together within the casing but having capacity for a limited relative play between them, said finger and lever having their respective extremities engaging the adjacent ends of the friction band, a spring operative between the said finger and lever in such manner that the resistive friction of the band is rendered greater to rotation of the band in one direction than in the other; a shiftable cam operative upon said lever whereby the tension of the spring may be regulated to vary the frictional resistances induced; and means whereby said cam may be adjusted from the exterior of the casing.

4. A shock absorbing device comprising a circular casing; a relatively rotatable, split, friction band adapted for co-operation with the inner periphery of the casing, the ends of said band being separated by a considerable interval; a finger and an attached lever rotatable together within the casing but having capacity for a limited relative play between them, said finger and lever having their respective extremities engaging the adjacent ends of the friction band; a spring operative between the said finger and lever in such manner that the resistive friction of the band is rendered greater to rotation of the band in one direction than in the other; a shiftable cam operative upon said lever whereby the tension of said spring may be regulated to vary the frictional resistances induced; a stem to which said cam is secured, said stem extending to the exterior of the casing through the axis of the rotor finger; and a nut co-operative with a protruding portion of the stem so that the cam may be clamped in its various adjusted positions.

In testimony whereof, I have hereunto signed my name at Media, this 3rd day of June, 1920.

EDMUND S. BRADFIELD.

Witnesses:
 HARRY P. OTTEY,
 ALLEN P. OTTEY.